United States Patent [19]

Baracat et al.

[11] Patent Number: 4,940,262

[45] Date of Patent: Jul. 10, 1990

[54] CABLE STRAIN RELIEF

[75] Inventors: Frederick A. Baracat, Coral Springs; Stanley A. Yaeger, Jr., Plantation, both of Fla.

[73] Assignee: Motorola, Inc., Schaumburg, Ill.

[21] Appl. No.: 361,084

[22] Filed: Jun. 5, 1989

[51] Int. Cl.[5] .............................................. F16L 35/00

[52] U.S. Cl. .................................... 285/114; 285/330; 285/913; 403/342; 439/455; 29/525.1

[58] Field of Search ....................... 285/114, 330, 913; 403/342; 439/470, 455, 463, 464, 473; 29/525.1

[56] References Cited

U.S. PATENT DOCUMENTS

| | | | |
|---|---|---|---|
| 797,049 | 8/1905 | Kaiser | 439/455 |
| 4,310,213 | 1/1982 | Fetterolf et al. | 439/455 X |
| 4,767,356 | 8/1988 | Grappe | 439/455 |

*Primary Examiner*—Dave W. Arola
*Attorney, Agent, or Firm*—Daniel K. Nichols

[57] ABSTRACT

A band (or eyelet) (16 or 17) is crimped onto a cable (12) so as to form at least one flange (18 or 19). The flange (18 or 19) is received in a slot between fingers (23) of a receptacle (20) so as to provide both longitudinal and rotational strain relief.

4 Claims, 2 Drawing Sheets

CABLE STRAIN RELIEF

TECHNICAL FIELD

This invention relates generally to cable strain relieving devices, and more specifically, to those cable strain relieving devices designed to prevent rotation about the cable axis.

BACKGROUND ART

Cable strain relieving devices are known to provide longitudinal protection. That is, such strain relieving devices prevent the cable from being pulled from (or pushed into) the device or apparatus that the cable is connected to. However, these devices typically do not provide protection for rotation about the cable's axis. Excessive rotation may break the connection of the wires to the device or apparatus that the cable is connected to.

Others that have attempted to prevent or reduce axial rotation of the cable, have employed complicated mechanical structures or arrangements that increase both the cost of the cable strain relieving device and the complexity of its manufacture. Accordingly, a need exists for a simple and inexpensive cable strain relieving device that prevents axial rotation and longitudinal movement.

SUMMARY OF THE INVENTION

Accordingly, it is an object of the present invention to provide a cable strain relieving device that prevents longitudinal movement and axial rotation while avoiding the detriments of the prior art.

Briefly, according to the invention, a band (or eyelet) is crimped onto a cable so as to form at least one flange. The flange is received by a corresponding slot(s) in a receptacle so as to provide both longitudinal and rotational strain relief.

DETAILED DESCRIPTION OF THE PREFERRED EMBODIMENT

Figures 1, 2:
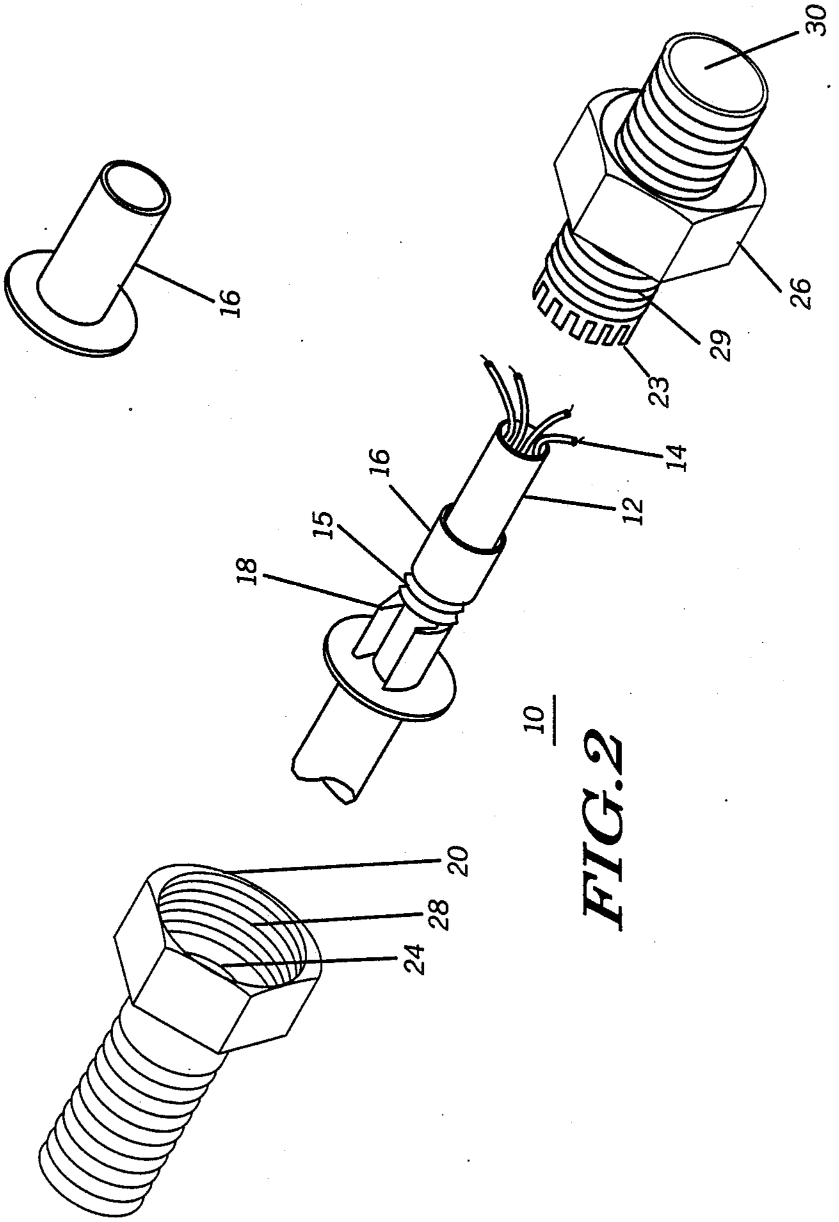
FIG. 1 is an illustration of a band or eyelet suitable for use with the present invention.
FIG. 2 is an illustration of a cable strain relieving device in accordance with the present invention.

Referring to FIG. 1, a band or eyelet 16 is shown. According to the invention, the band 16 is modified such as by crimping, re-forming or deforming to provide at least one flange 18, as shown in FIG. 2. The flanges 18, so formed, prevent axial rotation of the cable when they are engaged in slots between corresponding fingers of tabs 23 formed in a receptacle 26. Preferably, the band or eyelet 16 comprises a Model A1261 manufactured by Stimpson Co., Inc. of Pompano Beach, Fla. or its functional equivalent.

Referring to FIG. 2, a cable strain relieving device 10 in accordance with the present invention is shown. To assemble the device 10, a cable 12, having wires 14 contained therein, has attached thereto the band 16, which has been modified (such as by crimping) to have at least one flange 18. Preferably, two flanges are used, however, less or more flanges may be used in any particular implementation of the present invention. Radial crimp ribs 15 are formed in eyelet 16 to clamp the eyelet to the cable 12. The flanges 18 are engaged in slots between adjacent fingers or tabs 23, which are constricted by deforming when mated with receptacle 20. The cable 12 is inserted into an opening 24 of the receptacle 20. When mated in the slot(s) between adjacent fingers 23, the flanges 18 prevent axial rotation of the cable 12. To complete the assembly, a cap (or collar) 26 engages the receptacle 20 via mating threads 28 and 29 formed in the members 20 and 26. Longitudinal strain relief is contemporaneously provided since the flanges 18 are larger than the diameter of the opening 24 of the receptacle 20 and the opposite end of eyelet 16 is seated within the opening 30 of the cap 26. Preferrably, the receptacle 20 comprises a Model 3464 manufactured by Heyco of Kenilworth, N.J.

Figures 3, 4:
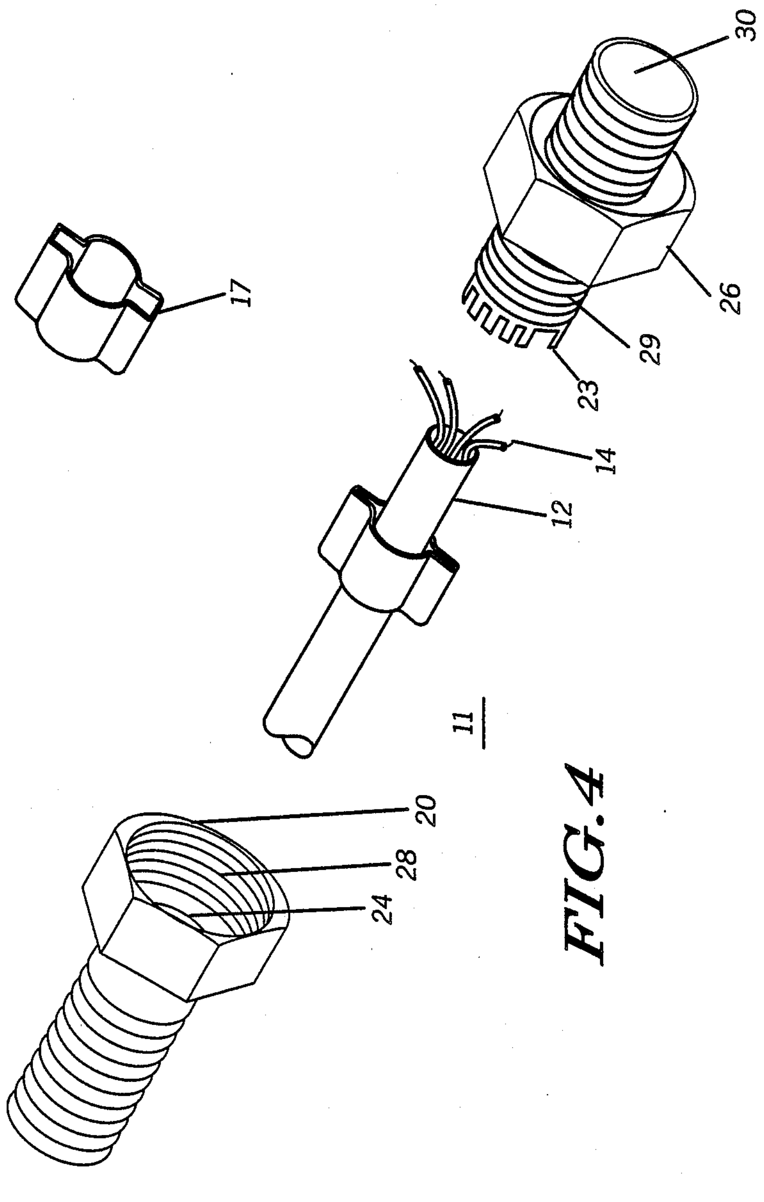
FIG. 3 is an illustration of another band or eyelet suitable for use with the present invention.
FIG. 4 is an illustration of another cable strain relieving device in accordance with the present invention.

An alternative preferred embodiment is illustrated in FIGS. 3 and 4. Referring to FIG. 3, a band or eyelet 17 is shown. According to the invention, the band 17 is modified such as by crimping, re-forming or deforming to provide at least one flange 19. The flanges 19 so formed prevent axial rotation of the cable when they engage corresponding slots formed in a receptacle. Preferably, the band or eyelet 17 comprises a Model 0305 manufactured by Oetiker, Inc. of Livingston, N.J. or its functional equivalent.

Referring to FIG. 4, a cable strain relieving device 11 in accordance with the present invention is shown. To assemble the device 11, a cable 12, having wires 14 contained therein, has attached thereto the band 17, which has been modified (such as by crimping) to have at least one flange 19. Preferably, two flanges are used to provide symmetrical flanges, however, less or more flanges may be used in any particular implementation of the present invention. The flanges 19 are engaged in slots between adjacent fingers or tabs 23 which are constricted by deforming when mated with receptacle 20 by inserting the cable 12 into the opening 24 of the receptacle. When mated with the slots between the fingers 23, the flanges 19 prevent axial rotation of the cable 12. To complete the assembly, a cap (or collar) 26 engages the receptacle 20 via corresponding threads 28 and 29 formed in the members 20 and 26. Longitudinal strain relief is contemporaneously provided since the flanges 19 are larger than the diameter of the opening 24 of the receptacle 20 and the opening 30 of the cap 26. Preferrably, the receptacle 20 also comprises a Model 3464 manufactured by Heyco of Kenilworth, N.J. Due to the relative thickness of the flanges 19 one or more of the fingers 23 at are removed to form the slots 22.

In summary, a strain relieving device is provided which achieves both rotational and longitudinal protection via a band that is crimped to the cable in a single operation. This provides inexpensive but effective protection from rotational and longitudinal stresses placed on the cable.

What is claimed is:

1. A cable strain relief device, comprising:
   - a cable having a band attached thereto the band being crimped to provide at least one radial crimp rib and crimped to clamp the band to the cable; and
   - a receptacle comprising a plurality of fingers having at least one slot formed between the fingers therein to engage said at least one radial crimp rib and means to retain said at least one radial crimp rib in said at least one slot.

2. The device of claim 1, wherein the band is crimped to provide two radial crimp ribs and the receptacle comprising fingers having two slots formed between the fingers therein each said radial crimp rib is receive in each said slot.

3. A method for relieving stress from a cable, comprising the steps of:

(a) crimping a metal band in clamping engagement on the cable and forming at least one radial crimp rib to provide a cable assembly; and (b) coupling the cable assembly to a receptacle comprising a plurality of fingers having at least one slot formed therebetween to engage said at least one radial crimp rib of the cable assembly and providing means to retain said at least one radial crimp rib in said at least one slot.

4. The method of claim 3, wherein step (a) comprises crimping a metal band so as to form two radial crimp ribs to provide the cable assembly and coupling said cable assembly to a receptacle comprising fingers having two slots formed therein to engage the two radial crimp ribs of the cable assembly.

* * * * *